United States Patent
Paras Ram et al.

(10) Patent No.: US 11,682,293 B2
(45) Date of Patent: Jun. 20, 2023

(54) SECURITY ECOSYSTEM

(71) Applicant: MOTOROLA SOLUTIONS, INC., Chicago, IL (US)

(72) Inventors: Anoop Sehgal Paras Ram, Ipoh (MY); Nur Amalina Rosly, Taiping (MY); Joe Yie Chong, Ipoh (MY); Wei Theng Wong, Bandar Baru Air Itah (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 47 days.

(21) Appl. No.: 17/447,455

(22) Filed: Sep. 13, 2021

(65) Prior Publication Data
US 2023/0103002 A1    Mar. 30, 2023

(51) Int. Cl.
*G08B 27/00* (2006.01)
*H04L 12/24* (2006.01)
*H04L 41/08* (2022.01)

(52) U.S. Cl.
CPC ............... *G08B 27/005* (2013.01); *H04L 41/0883* (2013.01)

(58) Field of Classification Search
CPC ........ G08B 27/00; G08B 27/005; H04L 41/00; H04L 41/08-0806; H04L 41/0813-082; H04L 41/0823; H04L 41/0866; H04L 41/084; H04L 41/0846; H04L 41/0873; H04L 41/0876; H04L 41/0883
See application file for complete search history.

(56) References Cited

U.S. PATENT DOCUMENTS

| | | | |
|---|---|---|---|
| 10,129,711 B1 | 11/2018 | Saadoun et al. | |
| 10,341,824 B1 | 3/2019 | Tov et al. | |
| 10,841,122 B1* | 11/2020 | Jensen et al. | H04L 41/0883 |
| 10,846,062 B1* | 11/2020 | Drake et al. | G06F 9/543 |
| 11,026,061 B2 | 6/2021 | Gan et al. | |
| 11,495,119 B1* | 11/2022 | Lim et al. | G06Q 10/08 |
| 2014/0089482 A1* | 3/2014 | Acuna et al. | H04L 41/147 709/223 |
| 2019/0121497 A1 | 4/2019 | Tov et al. | |
| 2019/0306051 A1* | 10/2019 | Seetharaman et al. | H04L 45/42 |
| 2020/0380968 A1* | 12/2020 | Hatfield et al. | G06N 3/02 |
| 2021/0103811 A1* | 4/2021 | Kim | G06N 5/04 |
| 2021/0136012 A1* | 5/2021 | Barbitta et al. | H04L 67/535 |
| 2021/0342124 A1* | 11/2021 | Cote et al. | G06N 20/00 |
| 2021/0374201 A1* | 12/2021 | Wu et al. | G06K 9/6267 |

OTHER PUBLICATIONS

Orchestrate System Planner, Motorola Solutions, Inc. - MN007836A01-B, Mar. 2021, all pages.
Orehestrate User Guide, Motorola Solutions, Inc. - MN007834A01-B, Mar. 2021, all pages.

\* cited by examiner

*Primary Examiner* — Boris D Grijalva Lobos

(57) ABSTRACT

A system, method, and apparatus for implementing workflows across multiple differing systems and devices is provided herein. During operation, a workflow is automatically generated to allow users affected by an action of a workflow to control various IoT devices associated with a trigger of a workflow.

6 Claims, 12 Drawing Sheets

SECURITY ECOSYSTEM

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. During operation, a workflow is automatically generated to allow users affected by an action of a workflow to control various IoT devices associated with a trigger of a workflow.

Figure 1A:
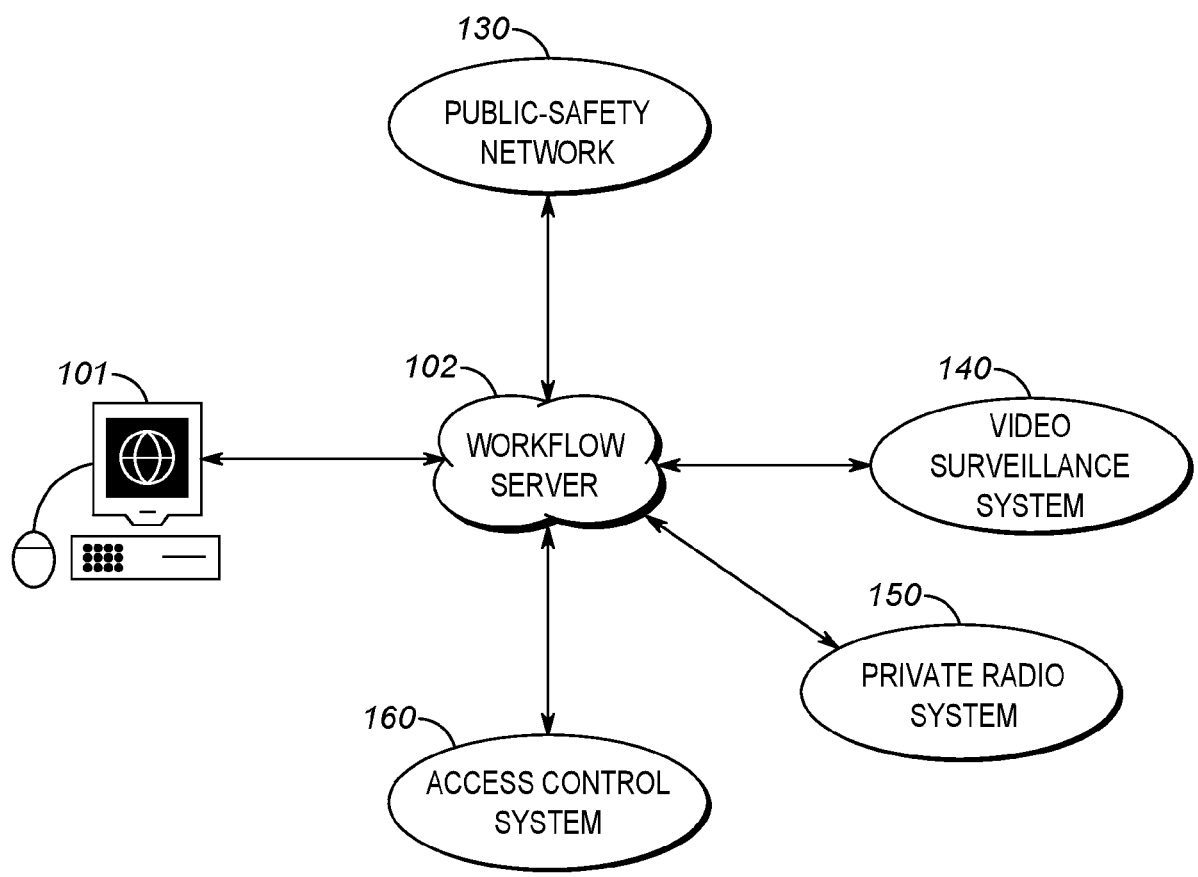
FIG. 1a illustrates a security ecosystem capable of configuring and automating workflows.

Turning now to the drawings, wherein like numerals designate like components, FIG. 1a illustrates security ecosystem 100 capable of generating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, ... , etc. It should also be noted that although only networks and systems 130-160 are shown in FIG. 1a, one of the ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Video surveillance system 140 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/ video analysis engine (VAE) that comprises a software engine that analyzes any video captured by the cameras. Using the VAE, the video surveillance system 140 is capable of "watching" video to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

It should be noted that among the various VAEs possible of being utilized by video surveillance system 140, a VAE that detects denial of entry is implemented. Additionally, a VAE that detects an appearance of the individual denied entry is also implemented. The VAE that detects denial of entry is configured to detect an interaction with a security guard resulting in no entry. The VAE that detects an appearance of an individual is configured to determine attributes of clothing worn by the person denied entry. Such attributes comprise things like, a color of clothing worn by the individual denied entry (e.g., blue shirt, red pants, black dress, ... , etc.), a type of clothing worn by the individual denied entry (e.g., a dress, short pants, long pants, t-shirt, tie, ... , etc.).

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOTRBO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, ... , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capabilities to detect triggers across a number of devices within networks and systems 130-160 quickly take actions by automatically executing the proper procedure (i.e., executing the appropriate action once a trigger is detected).

Figure 1B:
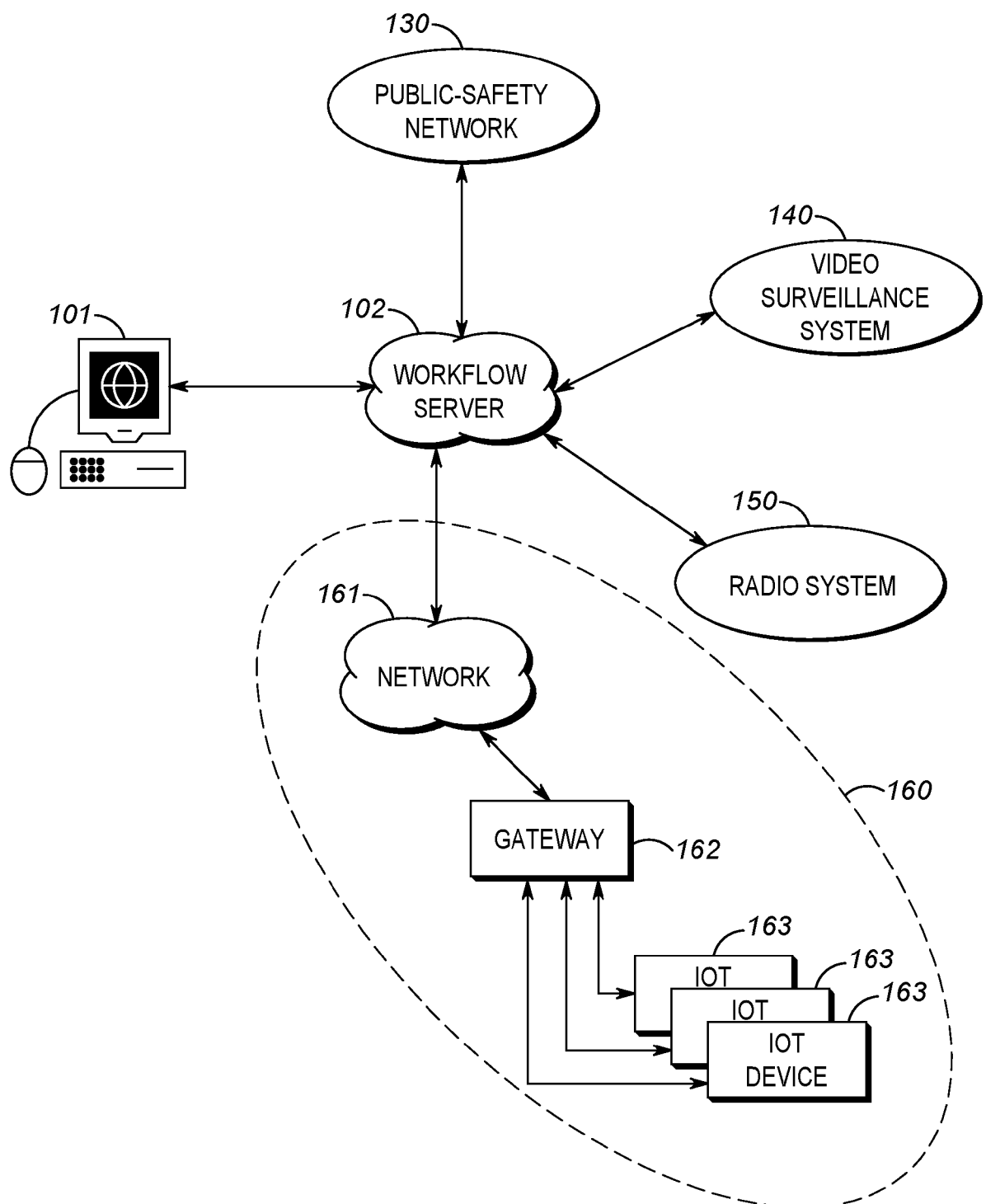
FIG. 1b illustrates a security ecosystem capable of configuring and automating workflows.

FIG. 1b illustrates a security ecosystem capable of configuring and automating workflows. In particular, FIG. 1b shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, lights, sensors, ... , etc. As is known in the art, a particular communication protocol (IoT protocol) may be used for each IoT device. For example, various proprietary protocols such as DNP, Various IEC**** protocols (IEC 61850 etc...), bacnet, EtherCat, CANOpen, Modbus / Modbus TCP, EtherNet / IP, PROFIBUS, PROFINET, DeviceNet, ... , etc. can be used. Also a more generic protocol such as Coap, Mqtt, and RESTful may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
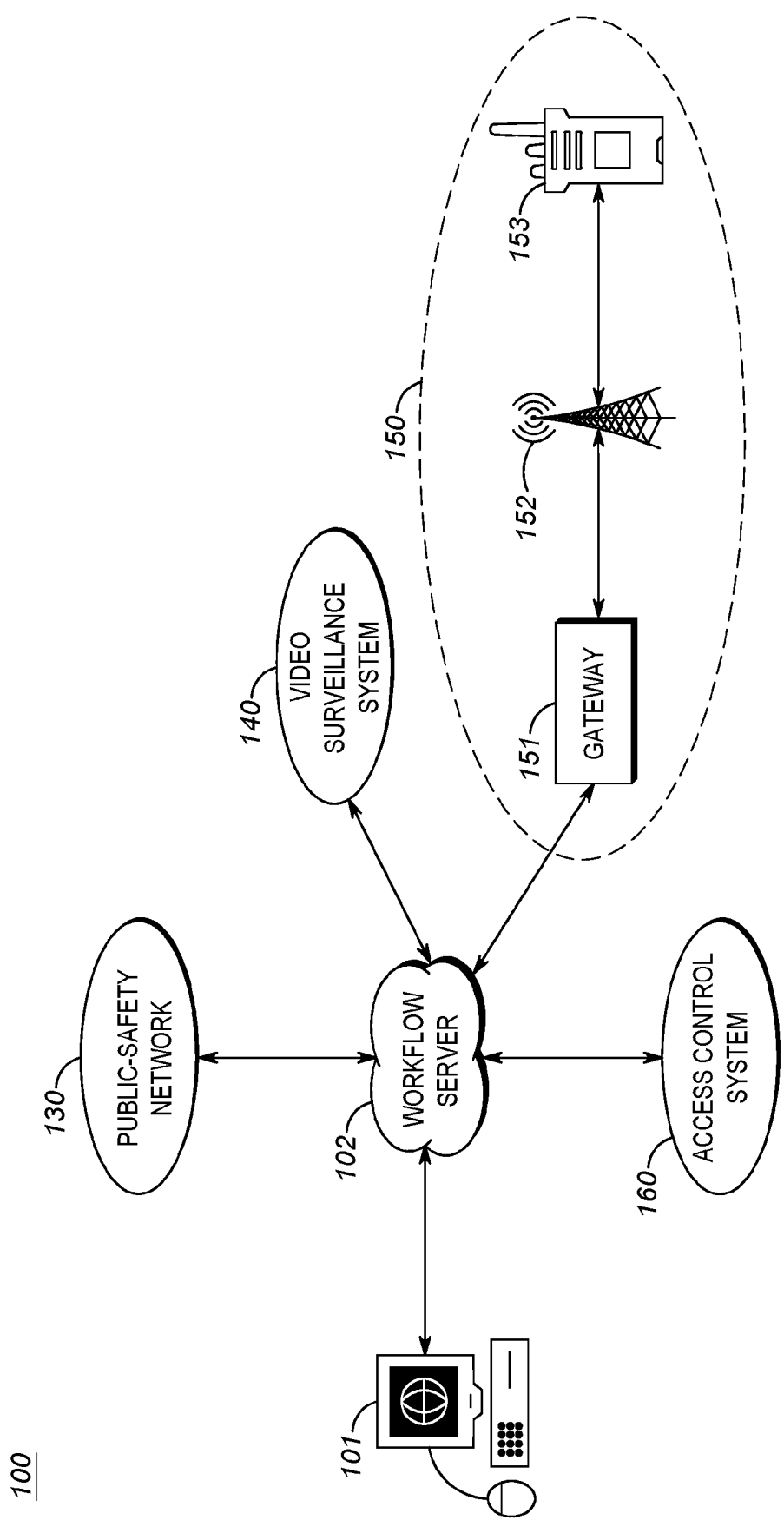
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOTRBO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOTRBO™ two-way radio (such as a Motorola Solution XPR 5000 Series radio) with digital technology providing integrated voice and data communication.

Figure 1D:
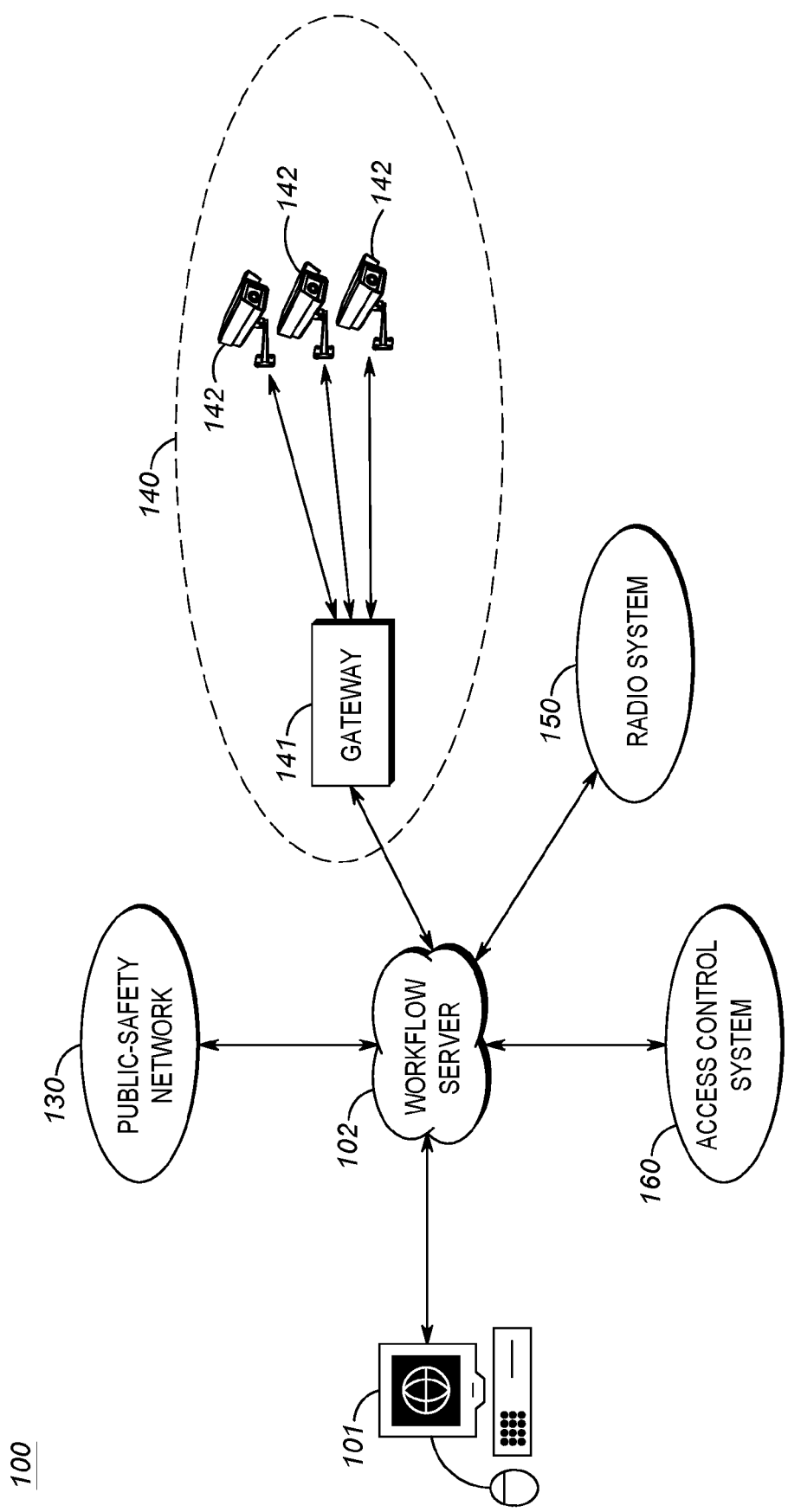
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine is configured to "watch" video and detect preselected objects such as license plates, people, faces, automobiles. The software engine may also be configured to detect certain actions of individuals, such as fighting, loitering, crimes being committed, ... , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
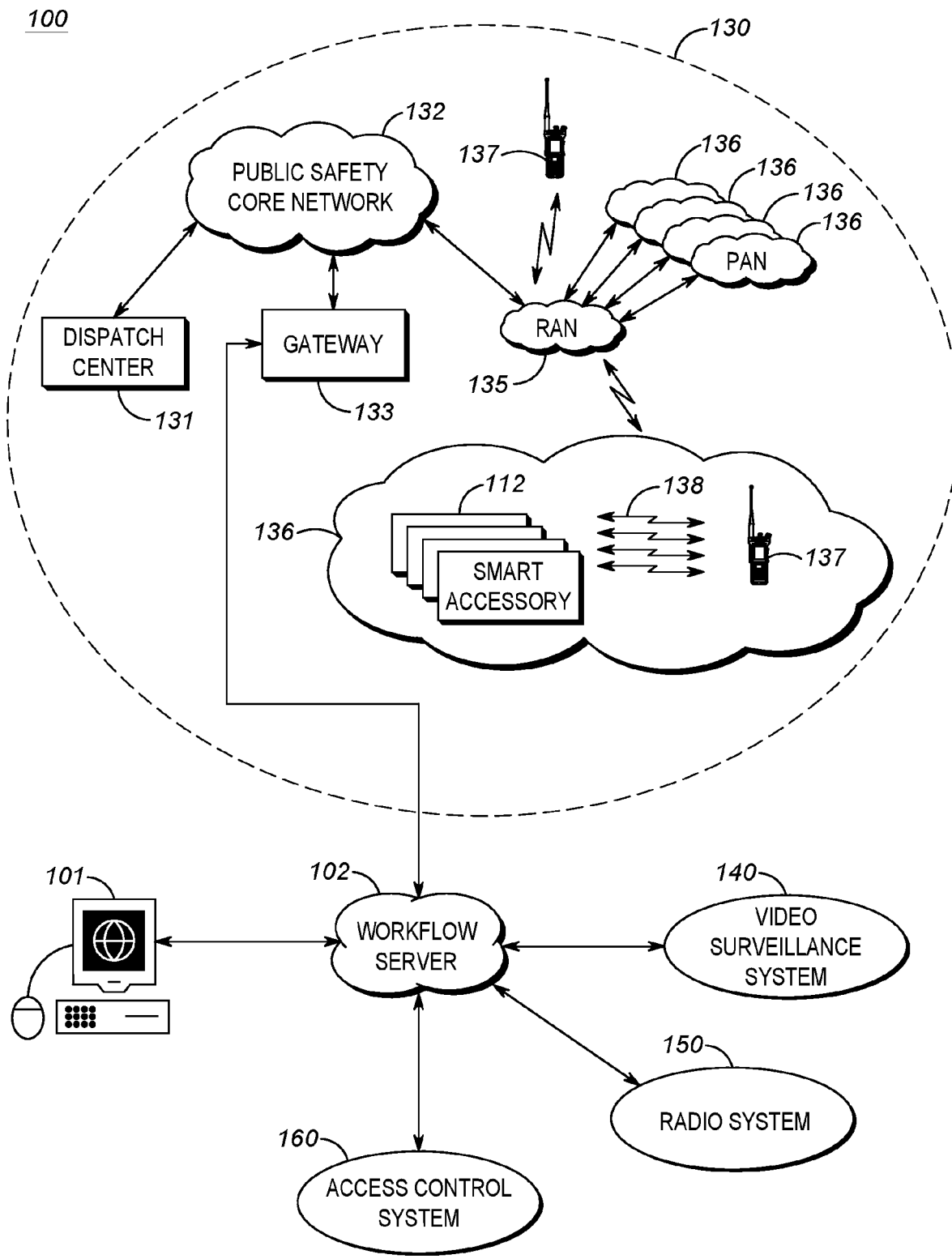
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a biosensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the predesignated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measure acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical-user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
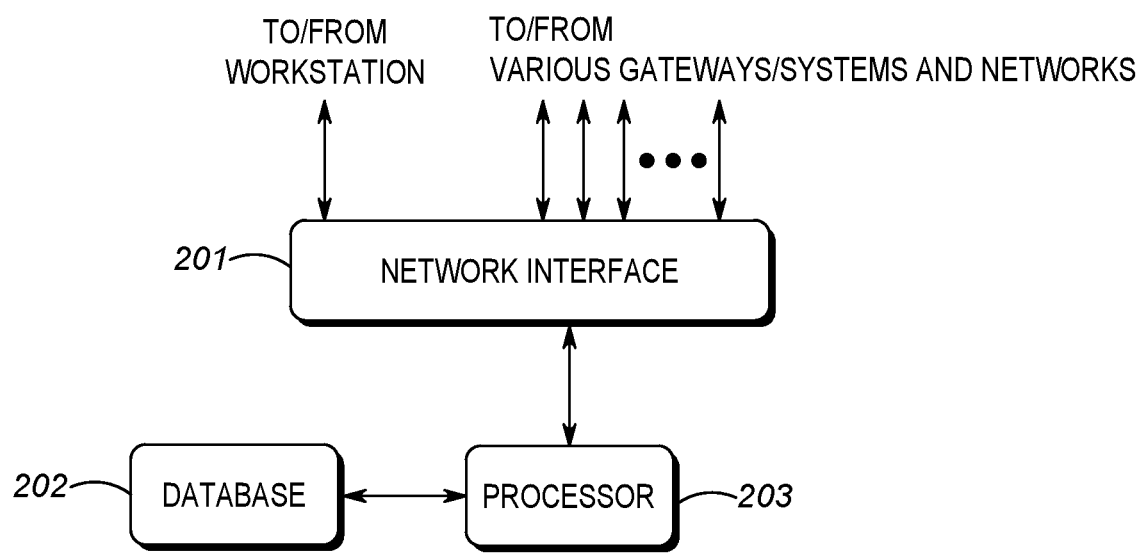
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 203 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action for the trigger. More particularly, when logic circuitry 203 receives a trigger from any attached network or system, logic circuitry will access database 202 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 202.

Database 202 comprises standard memory (such as RAM, ROM, ..., etc) and serves to store associations between triggers and actions. This is illustrated in Table 1, below.

TABLE 1

| Associations Between Triggers and Actions | |
|---|---|
| Trigger | Action |
| Warehouse back door opened | Pan camera 342 to point at door |
| Man-Down sensor activated for Officer Smith | Notify dispatch center via emergency text message |
| ALPR for delivery truck | Open back gate |
| ... etc. | ... etc. |

Figure 3:
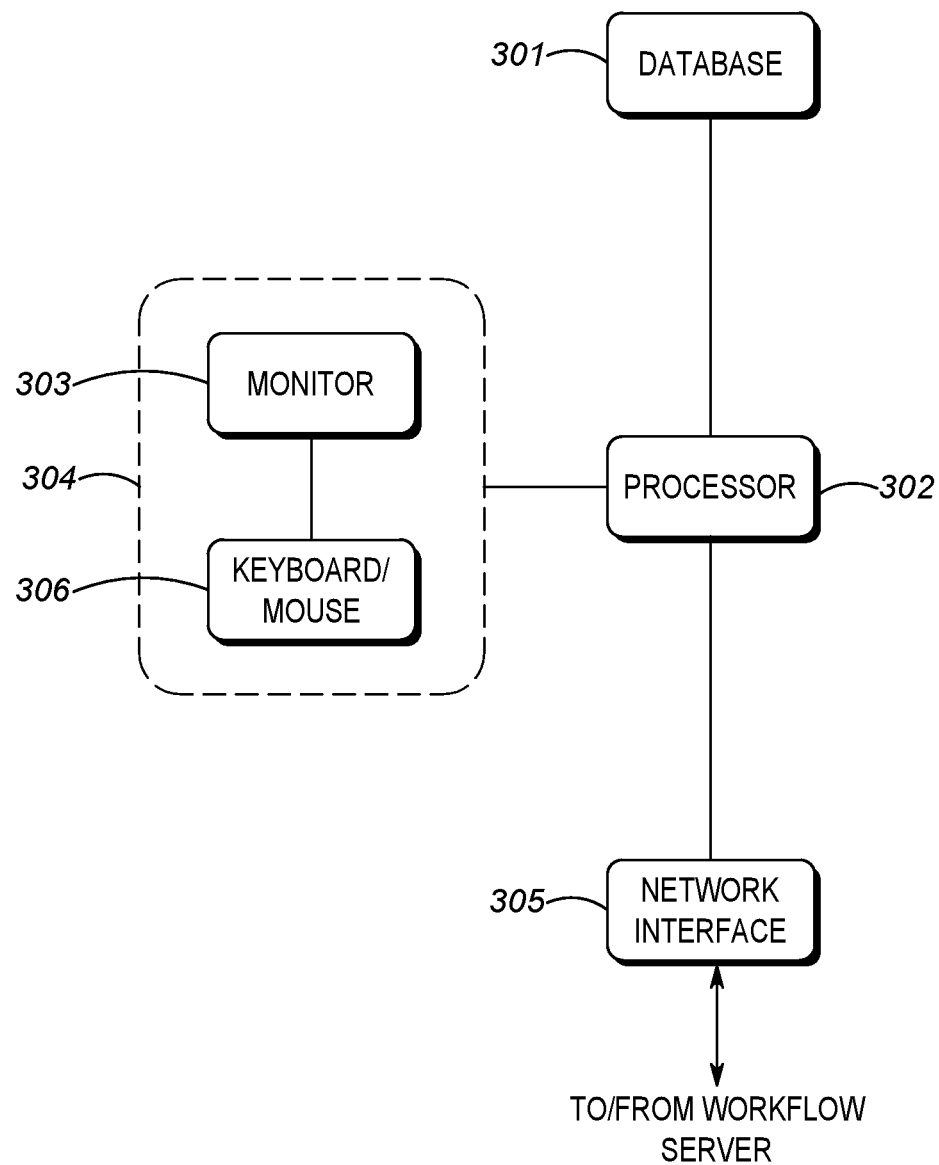
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical-user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, ..., etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, ..., etc.) and keyboard/mouse combination 306.

Figure 4:
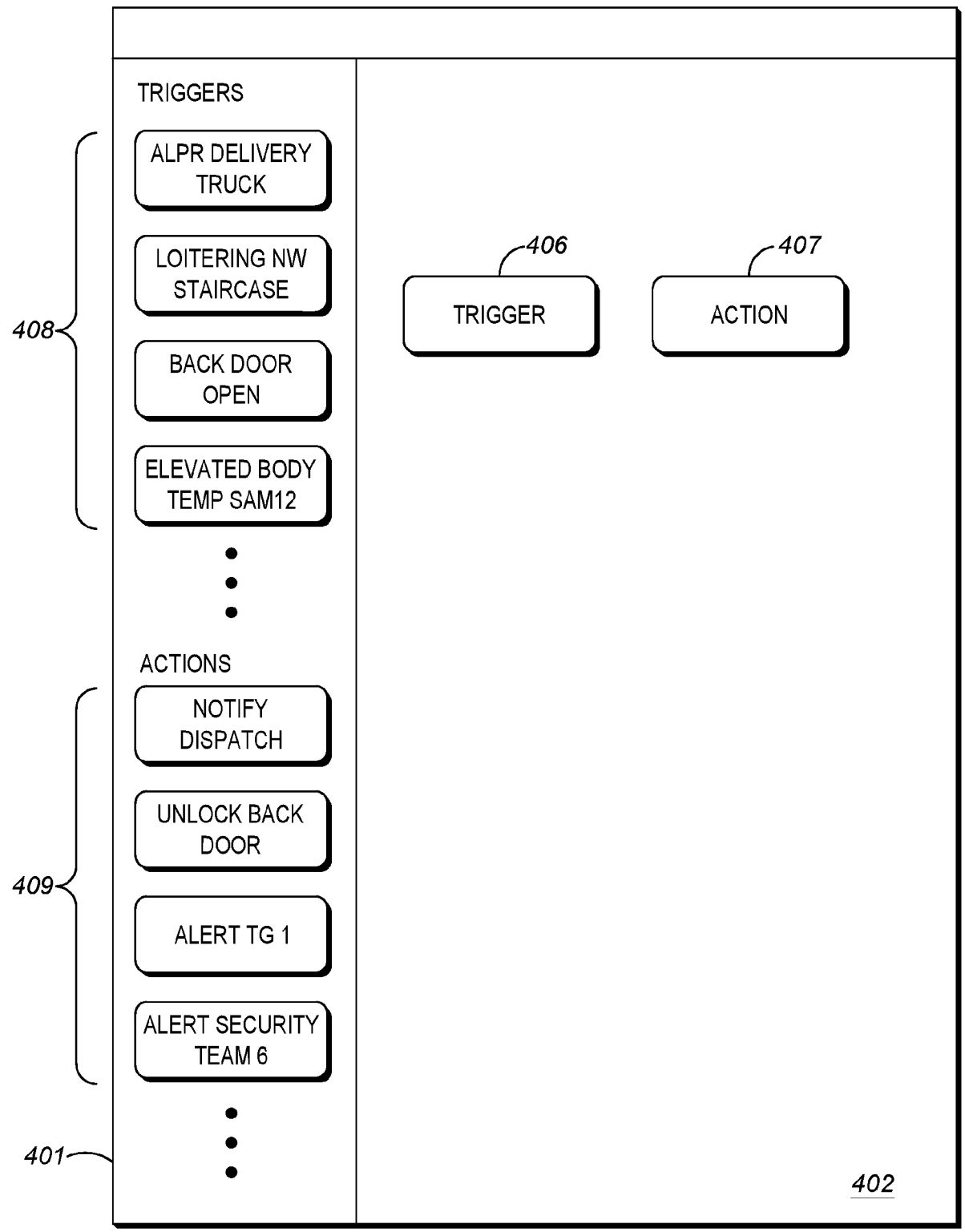
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:

selection pane 401 on the left-hand side, which comprises the available triggers 408 and actions 409;

workspace 402, which comprises the large area in the middle of the dashboard used to create workflows that define the connections between products. Each workflow in the workspace is displayed as a separate field 406 and 407 with an outline and a title. As shown in FIG. 4, two fields 406 and 407 are shown, one labeled "trigger" and another labeled "action".

Triggers 408 represent detected events originating from various sensors, software, and devices within security ecosystem 100. Actions 409 represent the possible responses to the triggers (detected events).

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, ..., etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 5:
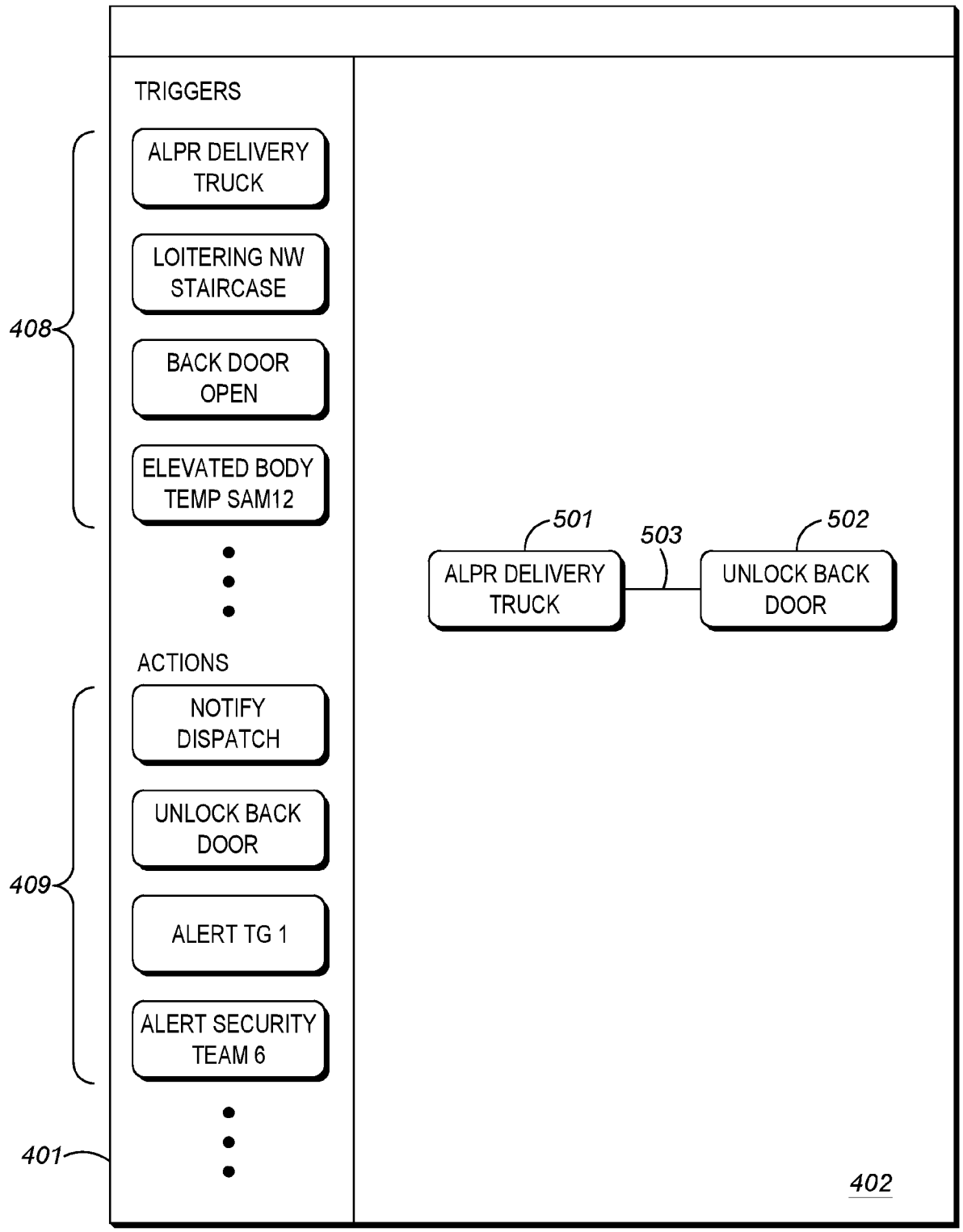
FIG. 5 illustrates the creation of a workflow.

As shown in FIG. 5, a trigger "ALPR delivery truck" 501 has been associated with an action "unlock back door" 502 by dragging line 503 between the two. If any of the triggers within a trigger group occurs, the workflow is initiated causing the action to be executed.

Figure 6:
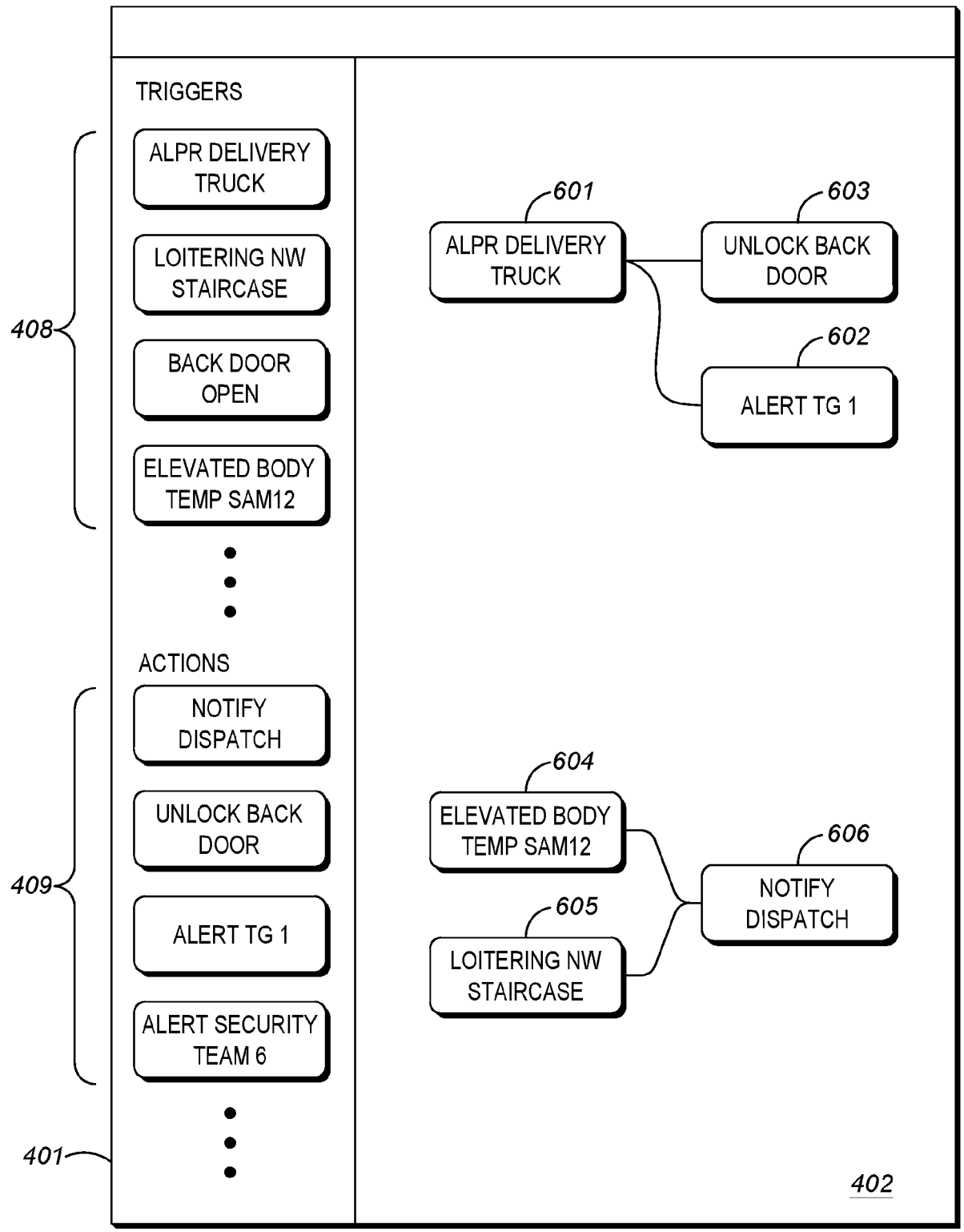
FIG. 6 illustrates the creation of a workflow.

As illustrated in FIG. 6, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

As mentioned above, users can create and implement workflows by associating a trigger with a particular action(s). A workflow comprises a trigger and at least one action. Triggers represent detected events originating from various sensors/cameras within the security ecosystem. Actions represent the possible responses to the triggers (detected events). For a workflow, once the trigger is detected, the associated action(s) is executed.

In some situations it would be beneficial if workflows can be automatically created, modified, or suggested to a user. For example, consider a situation where a person creates a workflow comprising a trigger that detects motion in a room after hours, and alerts a security team. In this situation, it would be beneficial if the security team could have access control for doors and lights in the room. With this in mind, it would be beneficial if a creator of a workflow could be provided with additional workflows that give access-control to IoT devices 163 that may be used by a subject of an action when a trigger is detected.

Consider the following example: Assume that a user creates a workflow that has a trigger of "motion detected in room 132 after 9 PM", and an action of "alert after-hours security team". As discussed above, the workflow is created by dragging a trigger from the list of triggers onto area 402, dragging an action from the list of actions into area 402, and connecting the two. For this workflow, it would be beneficial if the after-hours security team could have access to various IoT devices within room 132 (e.g., door locks, window locks, lights, HVAC control, ..., etc.). In order to address this issue, workstation 101 will provide the user with suggested workflows that allow the after-hours security team to have access to the various IoT devices within or nearby the room. This is illustrated in FIG. 7.

Figure 7:
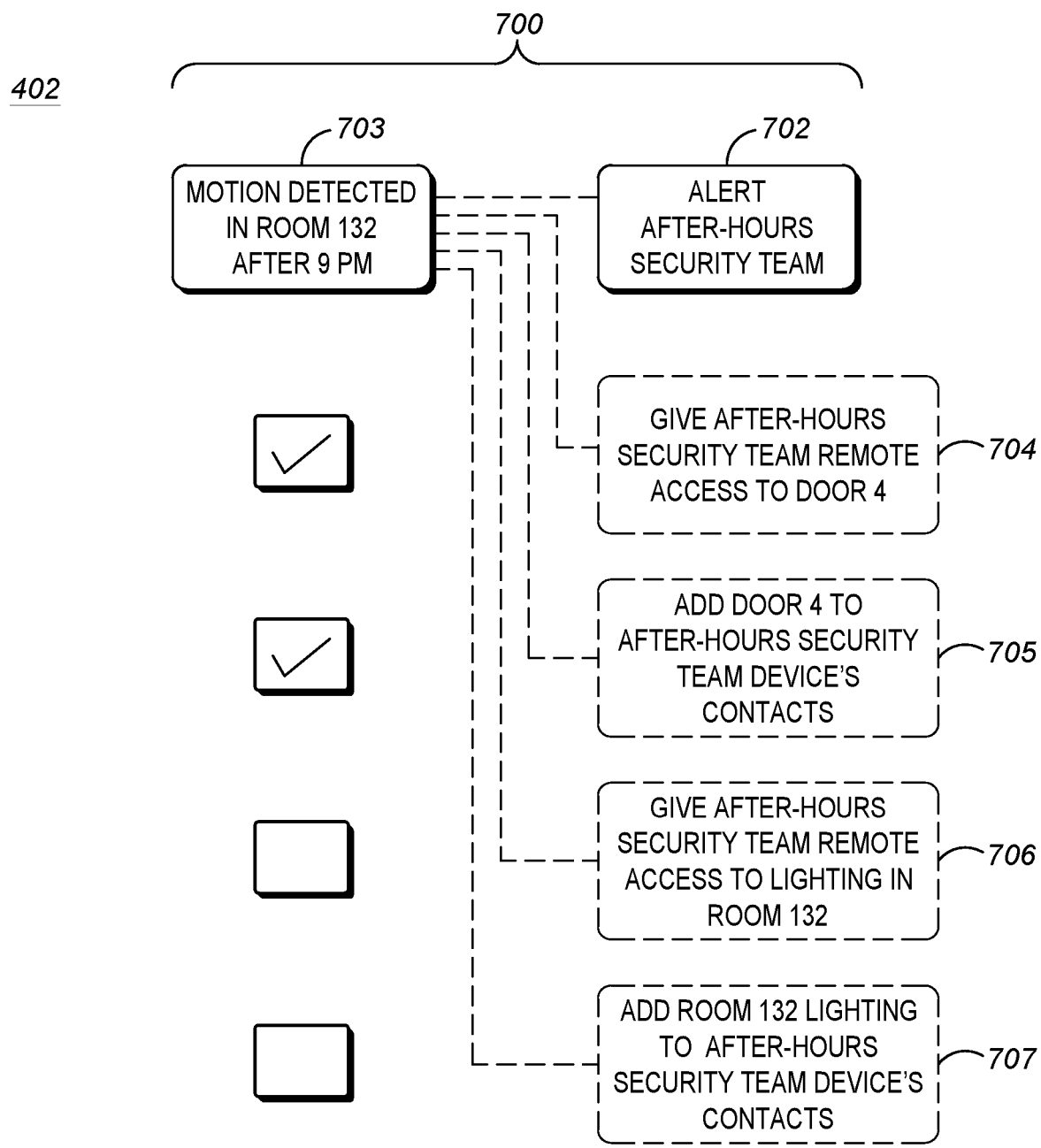
FIG. 7 illustrates a new workflow presented to a user.

As shown in FIG. 7, a user has created workflow 700 comprising trigger 703 and action 702. Trigger 703 comprises "motion detected in room 132 after 9 PM" and action 702 comprises "alert after-hours security team". In response, workstation 101 suggests alternative actions 704-707 that give the after-hours security team access to IoT devices within or near room 132. For example, proposed action 704 comprises "give after-hours security team remote access to door 4". Proposed action 705 comprises "add door 4 to after-hours security team device's contacts". Proposed action 706 comprises "give after-hours security team remote access to lighting in room 132". Finally, proposed action 707 comprises "add room 132 lighting to after-hours security team device's contacts".

As is evident, workflow 700 and proposed actions 704-707 are presented to the user in workspace 402. Additionally, a user is allowed to choose what suggested actions to implement. In one embodiment of the present invention, boxes are presented in workspace 402 that allows a user to check those boxes associated with actions that the user wishes to implement. Once the proposed workflows are chosen by a user, the user can send the accepted workflows along with workflow 700 to workflow server 102 for implementation.

In order to determine additional actions to propose to a user, logic circuitry 302 will analyze trigger 703 to determine nearby IoT devices (e.g., nearby a room or location associated with trigger 703 or nearby a room or location mentioned within the trigger). This may be accomplished by accessing a database of IoT devices and their locations. Either database 202 or database 301 may comprise this information (e.g., a location of IoT devices). The database may simply comprise IoT devices and their geographic location (e.g., latitude and longitude) or may comprise something as specific as a list of IoT devices associated with a particular building, room, or location (e.g., building 23 has IoT device 2322 door lock and IoT device 2323 HVAC control).

Once the trigger is analyzed to determine IoT devices nearby a room or location mentioned in trigger 703, action 702 is analyzed to determine individuals affected by action 702. The individuals affected by action 702 may comprise those individuals mentioned in action 702 or individuals associated with an entity or group mentioned in the action. For example, if an action comprises "notify Bill Smith", then Bill Smith is the individual mentioned in the action and affected by the action. However, if a group like "after-hours security team" is mentioned in the action, then a database 202 or 301 is accessed to determine members of the after-hours security team. Thus, a database exists that comprises all groups or entities mentioned in actions 409 along with their associated members.

As mentioned above, trigger 703 is analyzed to determine IoT devices nearby a geographical location (e.g., within 20 feet) associated within trigger 703. Action 702 is analyzed to determine those individuals affected by action 702. Based on the above, workflows are proposed that comprise trigger 703 and actions that provide users affected by action 702 control of IoT devices nearby the geographic location mentioned in the trigger. In addition to controlling the IoT devices, the actions may also comprise adding the IoT devices to a contacts list for devices used by individuals affected by action 702.

In order to implement any workflows seleced by a user, logic circuitry 302 sends a request to implement the workflows to workflow server 102. Processor 203 then implements the workflows. It should be noted that when trigger 703 is detected by processor 203, processor 203 will implement the chosen workflows by sending a request to public-safety core network 132 to give access for various individuals to IoT devices in access control system 160. This may be accomplished by creating a special talkgroup used by radios to control IoT devices as discussed in U.S. Pat. No. 11026061, entitled, "METHOD FOR REAL-TIME TALK-GROUP CREATION WITHIN A PUSH TO TALK FOR AN INTERNET OF THINGS SYSTEM", assigned to Motorola Solutions, Inc. and incorporated by reference herein. As mentioned in the '061 patent, an IoT talkgroup is created that gives radios 137 (used by the after-hours security team, for example) access to various IoT devices. In addition, an instruction may be given to core network 132 directing core network 132 to add various IoT devices nearby a geographical location associated with a trigger to user's address books. As mentioned, the "user's" in this case comprise those individuals affected by the action. In one embodiment of the present invention, core network 132 inserts the IoT devices to the address book of the users as described in U.S. Pat. Serial No. 15/787731 and WO2019/ 078990, "CONTACT LIST FOR THE INTERNET OF THINGS", assigned to Motorola Solutions, Inc. and incorporated by reference herein.

It should be noted that in the above example, proposed workflows were automatically created by workstation 101 in response to a user creating a workflow. In alternate embodiments of the present invention, the suggested workflows may be created upon a user requesting them to be created.

With the above in mind, workstation 101 provides for an apparatus comprising a database 301 comprising actions for workflows along with triggers for workflows, wherein a workflow comprises a trigger and at least one action, wherein triggers represent detected events originating from various sensors/cameras within a security ecosystem, wherein actions represent possible responses to the detected events, and wherein once the trigger is detected, the at least one action is executed. Logic circuitry is provided and configured to detect a user-created workflow comprising a first trigger and a first action, determine a subject affected by the first action of the user-created workflow, determine an IoT device associated with the first trigger of the user-created workflow, determine a first alternate-suggested workflow having the first trigger and a second action, wherein the second action comprises configuring a radio associated with the subject affected by the first action to give access to the IoT device associated with the first trigger of the user-created workflow. Graphical-user interface 304 is provided and configured to provide the alternative-suggested workflow to the user.

As discussed above, logic circuitry 302 is also configured to determine a second alternate-suggested workflow having the first trigger and a third action, wherein the third action comprises configuring a radio associated with the subject affected by the first action to place the IoT device associated with the first trigger of the user-created workflow into an address book.

Additionally, the graphical-user interface is also configured to receive a selection of proposed workflows from the user, and the logic circuitry is also configured to send any user-selected workflows to a workflow server for implementation.

Figure 8:
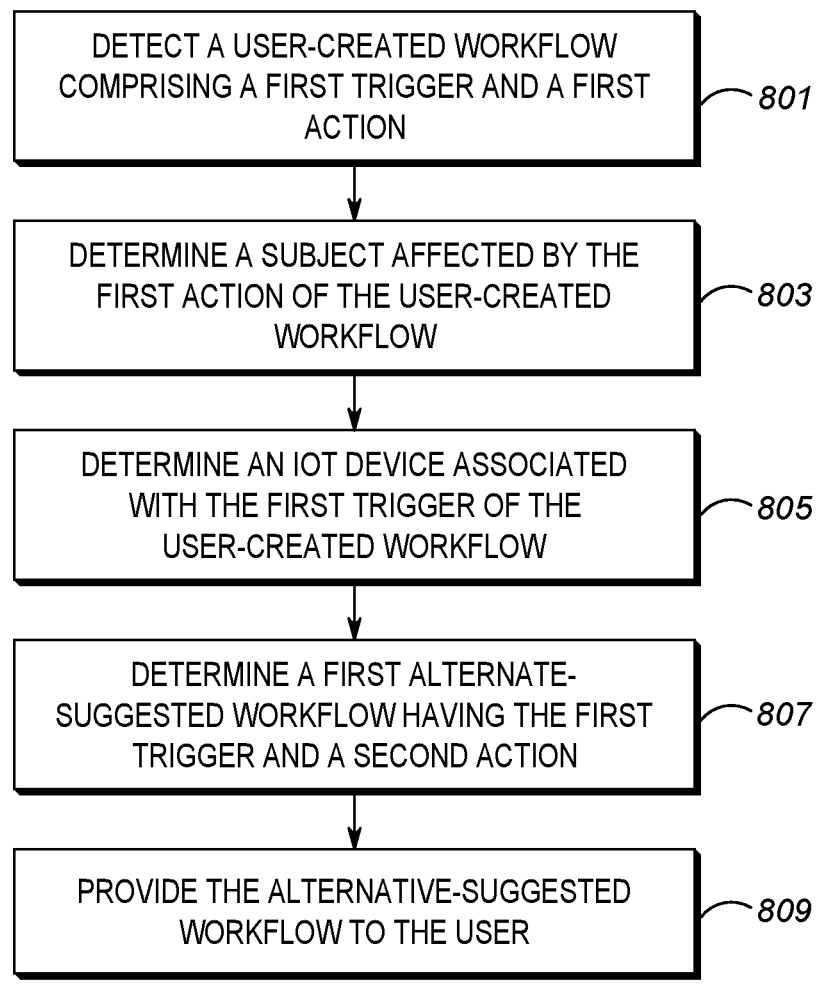
FIG. 8 is a flow chart showing operation of the workflow server of FIG. 1.

FIG. 8 is a flow chart showing operation of the workstation of FIG. 1. The logic flow begins at step 801 with logic circuitry 302 detecting a user-created workflow comprising a first trigger and a first action. The logic flow continues to step 803 where logic circuitry 302 determines a subject affected by the first action of the user-created workflow. At step 805, logic circuitry 302 determines an IoT device associated with the first trigger of the user-created workflow. The logic flow continues to step 807 where logic circuitry 302 determines a first alternate-suggested workflow having the first trigger and a second action, wherein the second action comprises configuring a radio associated with the subject affected by the first action to give access to the IoT device associated with the first trigger of the user-created workflow. Finally, at step 809 graphical-user interface 304 provides the alternative-suggested workflow to the user.

As discussed above, logic circuitry 302 may determine a second alternate-suggested workflow having the first trigger and a third action, wherein the third action comprises configuring a radio associated with the subject affected by the first action to place the IoT device associated with the first trigger of the user-created workflow into an address book.

Additionally a user may select any of the proposed workflows with logic circuitry 302 sending any user-selected workflows to a workflow server for implementation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ...a", "has ...a", "includes ...a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a database comprising actions for workflows along with triggers for workflows, wherein a workflow comprises a trigger and at least one action, wherein triggers represent detected events originating from various sensors or cameras within a security ecosystem, wherein actions represent possible responses to the detected events, and wherein once the trigger is detected, the at least one action is executed;
logic circuitry configured to:
   detect a user-created workflow comprising a first trigger and a first action;
   determine a subject affected by the first action of the user-created workflow;
   determine an IoT device associated with the first trigger of the user-created workflow;
   determine a first alternate-suggested workflow having the first trigger and a second action, wherein the second action comprises configuring a radio associated with the subject affected by the first action to give access to the IoT device associated with the first trigger of the user-created workflow;
a graphical-user interface configured to provide the first alternative-suggested workflow to the user;
wherein the graphical-user interface is also configured to receive a selection of proposed workflows from the user; and
wherein the logic circuitry is also configured to send any user-selected workflows to a workflow server for implementation.

2. The apparatus of claim 1 wherein the logic circuitry is further configured to:
determine a second alternate-suggested workflow having the first trigger and a third action, wherein the third action comprises configuring a radio associated with the subject affected by the first action to place the IoT device associated with the first trigger of the user-created workflow into an address book.

3. An apparatus comprising:
a database comprising actions for workflows along with triggers for workflows, wherein a workflow comprises a trigger and at least one action, wherein triggers represent detected events originating from various sensors or cameras within a security ecosystem, wherein actions represent possible responses to the detected events, and wherein once the trigger is detected, the at least one action is executed;
logic circuitry configured to:
   detect a user-created workflow comprising a first trigger and a first action;
   determine a subject affected by the first action of the user-created workflow;
   determine an IoT device associated with the first trigger of the user-created workflow;
   determine a first alternate-suggested workflow having the first trigger and a second action, wherein the second action comprises configuring a radio associated with the subject affected by the first action to give access to the IoT device associated with the first trigger of the user-created workflow;
   determine a second alternate-suggested workflow having the first trigger and a third action, wherein the third action comprises configuring a radio associated with the subject affected by the first action to place the IoT device associated with the first trigger of the user-created workflow into an address book;
a graphical-user interface configured to:
   provide the alternative-suggested workflows to the user;
   receive a selection of proposed workflows from the user; and
wherein the logic circuitry is also configured to send any user-selected workflows to a workflow server for implementation.

4. A method comprising the steps of:
detecting a user-created workflow comprising a first trigger and a first action;
determining a subject affected by the first action of the user-created workflow;
determining an IoT device associated with the first trigger of the user-created workflow;
determining a first alternate-suggested workflow having the first trigger and a second action, wherein the second action comprises configuring a radio associated with the subject affected by the first action to give access to the IoT device associated with the first trigger of the user-created workflow;

providing the first alternative-suggested workflow to the user;

receiving a selection of proposed workflows from the user; and sending any user-selected workflows to a workflow server for implementation.

5. The method of claim 4 further comprising the step of:

determining a second alternate-suggested workflow having the first trigger and a third action, wherein the third action comprises configuring a radio associated with the subject affected by the first action to place the IoT device associated with the first trigger of the user-created workflow into an address book.

6. A method comprising the steps of:

detecting a user-created workflow comprising a first trigger and a first action, determining a subject affected by the first action of the user-created workflow;

determining an IoT device associated with the first trigger of the user-created workflow;

determining a first alternate-suggested workflow having the first trigger and a second action, wherein the second action comprises configuring a radio associated with the subject affected by the first action to give access to the IoT device associated with the first trigger of the user-created workflow;

providing the first alternative-suggested workflow to the user;

receiving a selection of proposed workflows from the user; and sending any user-selected workflows to a workflow server for implementation.

* * * * *